(12) United States Patent
Wang

(10) Patent No.: US 11,279,406 B2
(45) Date of Patent: Mar. 22, 2022

(54) INTEGRATED VEHICLE FRAME

(71) Applicant: Quadrobot Inc., Madison Heights, MI (US)

(72) Inventor: Tianye Wang, Madison Heights, MI (US)

(73) Assignee: QUADROBOT INC., Madison Heights, MI (US)

( * ) Notice: Subject to any disclaimer, the term of this patent is extended or adjusted under 35 U.S.C. 154(b) by 250 days.

(21) Appl. No.: 16/739,611

(22) Filed: Jan. 10, 2020

(65) Prior Publication Data
US 2020/0223485 A1 Jul. 16, 2020

Related U.S. Application Data

(60) Provisional application No. 62/790,812, filed on Jan. 10, 2019.

(51) Int. Cl.
*B62D 21/02* (2006.01)
*B62D 21/11* (2006.01)
(Continued)

(52) U.S. Cl.
CPC ............. *B62D 21/02* (2013.01); *B60K 1/04* (2013.01); *B60R 19/24* (2013.01); *B62D 21/11* (2013.01);
(Continued)

(58) Field of Classification Search
CPC ........ B62D 21/02; B62D 21/05; B62D 21/06; B62D 21/07; B62D 21/08; B62D 21/11;
(Continued)

(56) References Cited

U.S. PATENT DOCUMENTS 3,499,661 A * 3/1970 Rowe, Jr. .............. B60R 19/285
280/794
4,049,309 A * 9/1977 Seal ....................... B62D 21/08
296/181.5
(Continued)

FOREIGN PATENT DOCUMENTS

| JP | 09118140 A | * | 5/1997 | ............... B60K 1/04 |
| JP | 2014125030 A | * | 7/2014 | ............... B60K 1/04 |

(Continued)

OTHER PUBLICATIONS

International Search Report and Written Opinion issued in co-pending International App. No. PCT/US2020/013082 dated Apr. 16, 2020 (6 pp).
(Continued)

*Primary Examiner* — Laura Freedman
(74) *Attorney, Agent, or Firm* — Young Basile Hanlon & MacFarlane, P.C.

(57) ABSTRACT

A frame for a vehicle includes a first housing and a second housing. The first housing and the second housing each define an interior space. The first housing and the second housing each comprises a first side portion and an opposing second side portion. The first housing and the second housing each include a first pair of triangular members coupled to the first side portion and a second pair of triangular members coupled to the second side portion. The first and second pairs of triangular members each support a wheel. A support assembly couples the first housing and the second housing. The support assembly includes an external lattice structure and an internal lattice structure. The external lattice structure is coupled to the first housing and the second housing. The internal lattice structure is coupled to the external lattice structure, the first housing, and the second housing.

10 Claims, 11 Drawing Sheets

(51) Int. Cl.
   *B60R 19/24* (2006.01)
   *B60K 1/04* (2019.01)
   *B62D 63/02* (2006.01)
   *B60P 3/20* (2006.01)
   *B60R 11/00* (2006.01)

(52) U.S. Cl.
   CPC ............ *B62D 63/025* (2013.01); *B60P 3/205* (2013.01); *B60R 2011/0003* (2013.01)

(58) Field of Classification Search
   CPC ........ B62D 21/12; B62D 63/025; B60K 1/04; B60K 2001/0438; B60R 19/24
   See application file for complete search history.

(56) References Cited

U.S. PATENT DOCUMENTS

| | | | | |
|---|---|---|---|---|
| 4,426,101 | A * | 1/1984 | Dyer | B60G 9/00 280/124.109 |
| 5,401,056 | A * | 3/1995 | Eastman | B60G 3/20 280/785 |
| 5,562,178 | A * | 10/1996 | Worden | B60K 1/00 180/291 |
| 5,833,269 | A * | 11/1998 | Gastesi | B62D 21/04 280/785 |
| 5,890,740 | A * | 4/1999 | Kami | B60G 99/00 280/834 |
| 6,830,117 | B2 * | 12/2004 | Chernoff | B60G 7/003 180/65.1 |
| 6,837,325 | B2 * | 1/2005 | Shimizu | B60L 50/66 180/68.5 |
| 7,641,236 | B2 | 1/2010 | Yasuhara et al. | |
| 8,079,435 | B2 * | 12/2011 | Takasaki | H05K 9/002 180/68.5 |
| 8,127,879 | B2 * | 3/2012 | Constans | B60G 7/02 180/89.12 |
| 8,672,354 | B2 * | 3/2014 | Kim | B62D 21/10 280/783 |
| 9,102,356 | B2 * | 8/2015 | Awano | B62D 27/026 |
| 9,227,582 | B2 * | 1/2016 | Katayama | B60L 3/0046 |
| 9,643,660 | B2 * | 5/2017 | Vollmer | B60L 50/60 |
| 9,937,781 | B1 * | 4/2018 | Bryer | B60K 1/04 |
| 10,581,126 | B2 * | 3/2020 | Milton | H01M 10/643 |
| 10,603,997 | B2 * | 3/2020 | Bergstrom | B60L 50/64 |
| 10,766,348 | B2 * | 9/2020 | Fukui | B62D 21/11 |
| 10,882,557 | B2 * | 1/2021 | Otoguro | B60K 1/04 |
| 2020/0369334 | A1 * | 11/2020 | Lee | B60L 50/60 |

FOREIGN PATENT DOCUMENTS

| | | |
|---|---|---|
| RU | 86164 U1 | 8/2009 |
| RU | 2661058 C1 | 7/2018 |
| WO | 2016/022523 A1 | 2/2016 |

OTHER PUBLICATIONS

Sabatini, J., "Forgotten Concept: 2002 GM Autonomy", Autoblog, https://www.autoblog.com/2010/09/24/forgotten-concept-2002-gm-autonomy/?guccounter=1&guce referrer= aHROcHM6Ly93d3cuZ29vZ2xILmNv, Sep. 24, 2010, (3 pp).

* cited by examiner

INTEGRATED VEHICLE FRAME

CROSS-REFERENCE TO RELATED APPLICATION

This application claims priority to U.S. Provisional Patent Application No. 62/790,812, filed Jan. 10, 2019, which is incorporated herein in its entirety by reference.

BACKGROUND

Electric vehicles are developed to decrease the dependence on fossil fuels. Typical body-on-frame and unibody vehicle frame designs require components such as the engine, transmission, steering, heat exchangers, etc. to be separately bolted, welded, or otherwise connected to the vehicle. Such designs enlarge the size of the vehicle, increase vehicle weight, and require complex design and assembly processes. Such designs often require standardized components that vary slightly in weight, shape, volume, and footprint. Typical vehicle frames further require vehicle manufactures to design different vehicle platforms to construct vehicles of varying shape, size, and performance.

SUMMARY

One aspect of this disclosure is a vehicle frame comprising a first housing and a second housing, where the first housing and the second housing each define an interior space. The first housing and the second housing each include a first side portion and an opposing second side portion. The first housing and the second housing each include a first end portion and an opposing second end portion, where the first end portion and the second end portion extend portion between the first side portion and the second side portion. The first housing and the second housing each include a first pair of triangular members coupled to the first side portion and a second pair of triangular members coupled to the second side portion, where the first pair of triangular members and the second pair of triangular members each supports a wheel. The vehicle frame includes a support assembly coupled to the first housing and the second housing. The support assembly includes a first elongate member and a second elongate member each coupled at one end to the first side portion of the first housing and coupled at an opposing end to the first side portion of the second housing. The support assembly includes a third elongate member and a fourth elongate member each coupled at one end to the second side portion of the first housing and coupled at an opposing end to the second side portion of the second housing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A compact and modular electric vehicle having an integrated vehicle frame is disclosed herein. The vehicle's modular design including a lower body and a removeable and replaceable upper body reduces maintenance time and costs, reduces the number of components needed for assembly, increases the number of standardized components, and allows the construction of a variety of vehicles without the need for designing multiple vehicle platforms. Additionally, the vehicle's power train, power train control, heating and cooling, suspension, and steering are contained in condensed housings that are integrated with the vehicle's frame and are capable of sustaining a structural load. These housings can be coupled to support assemblies of different dimensions to easily construct vehicles of any size and any power train type. This integrated design reduces the number of structural components and further reduces the vehicle's size and weight. By reducing the size, weight, and exterior profile of the vehicle, the vehicle is well-suited to maneuver in urban environments.

Figure 1:
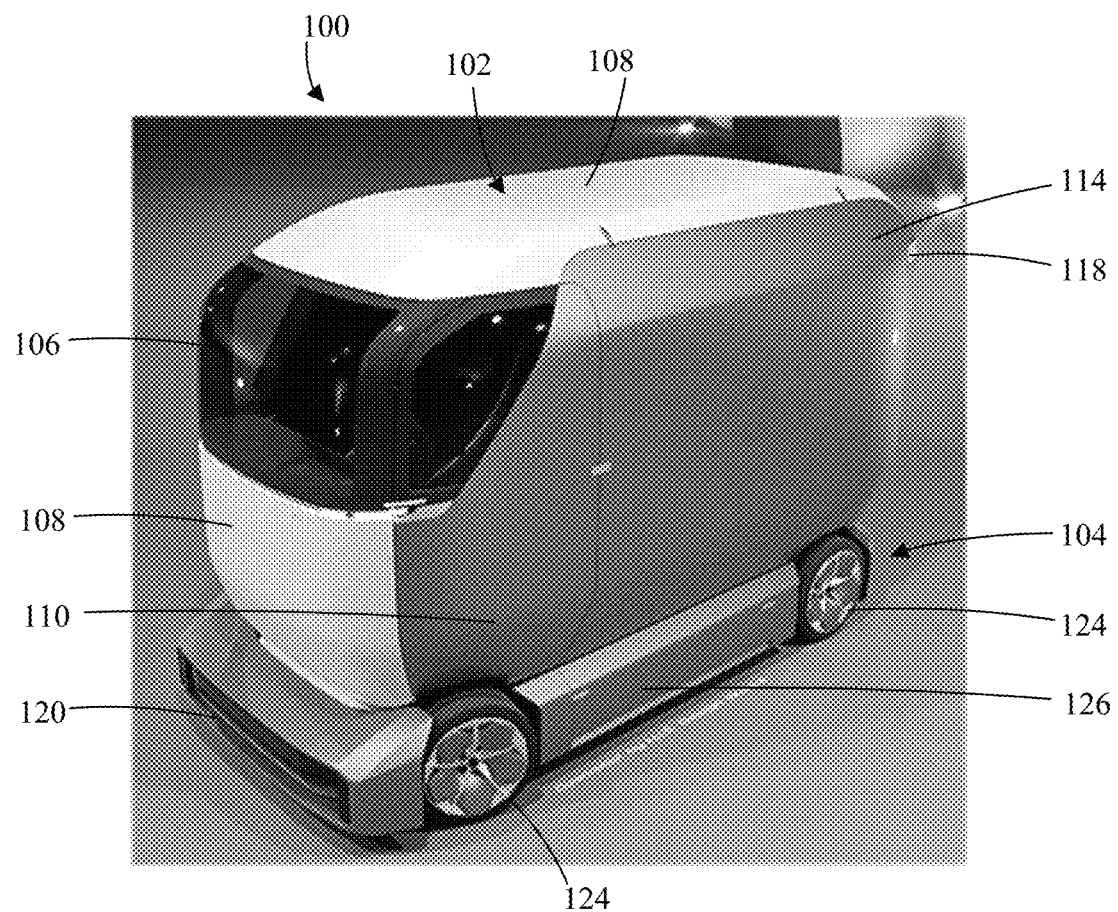
FIG. 1 is a front, top, and left side perspective view of a vehicle.
Figure 2:
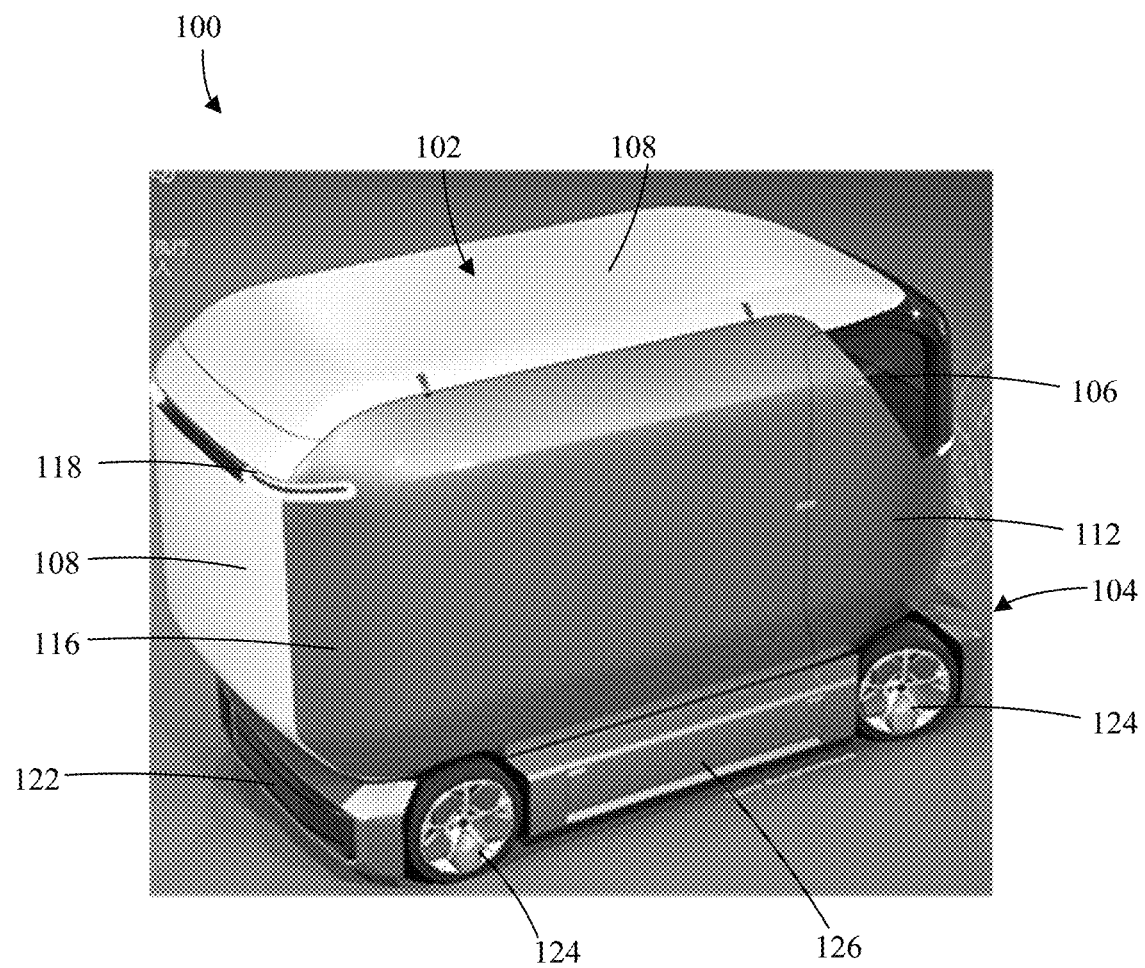
FIG. 2 is a rear, top, and right-side perspective view of the vehicle.
Figure 3:
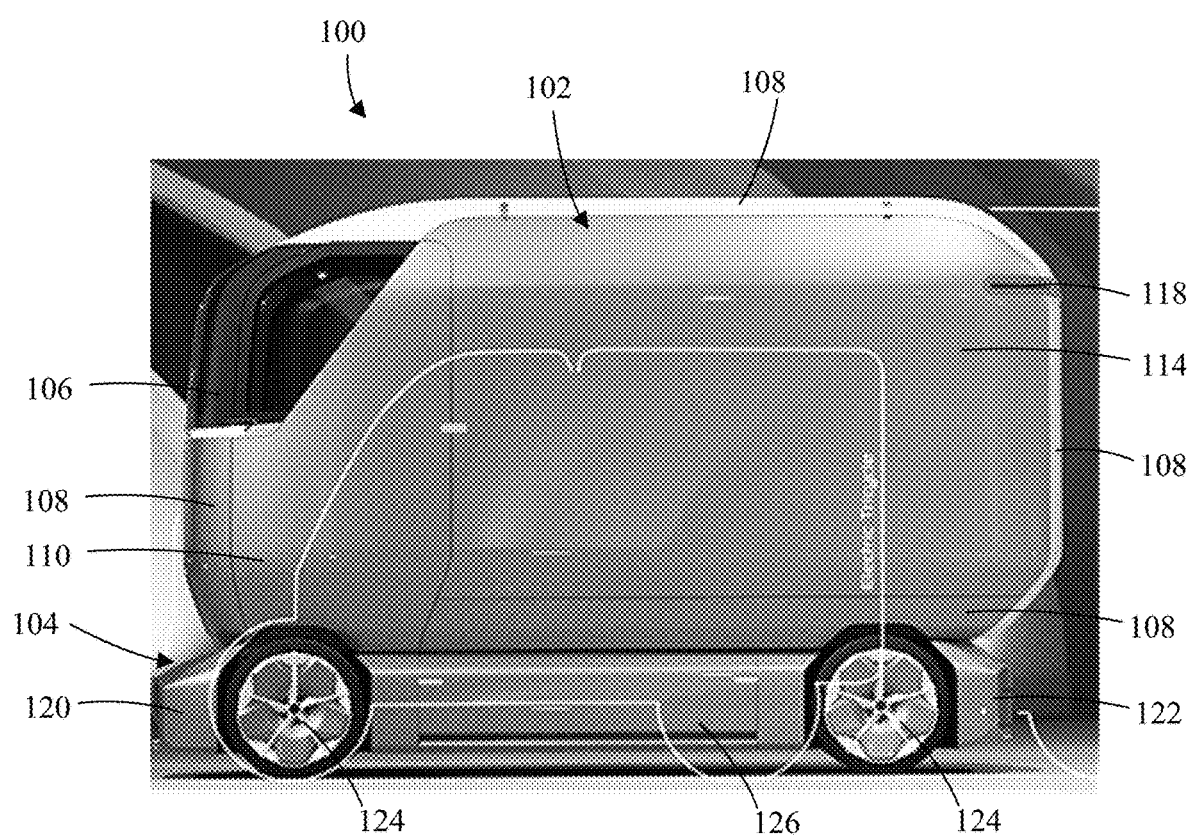
FIG. 3 is a left side view of the vehicle.
Figure 4:
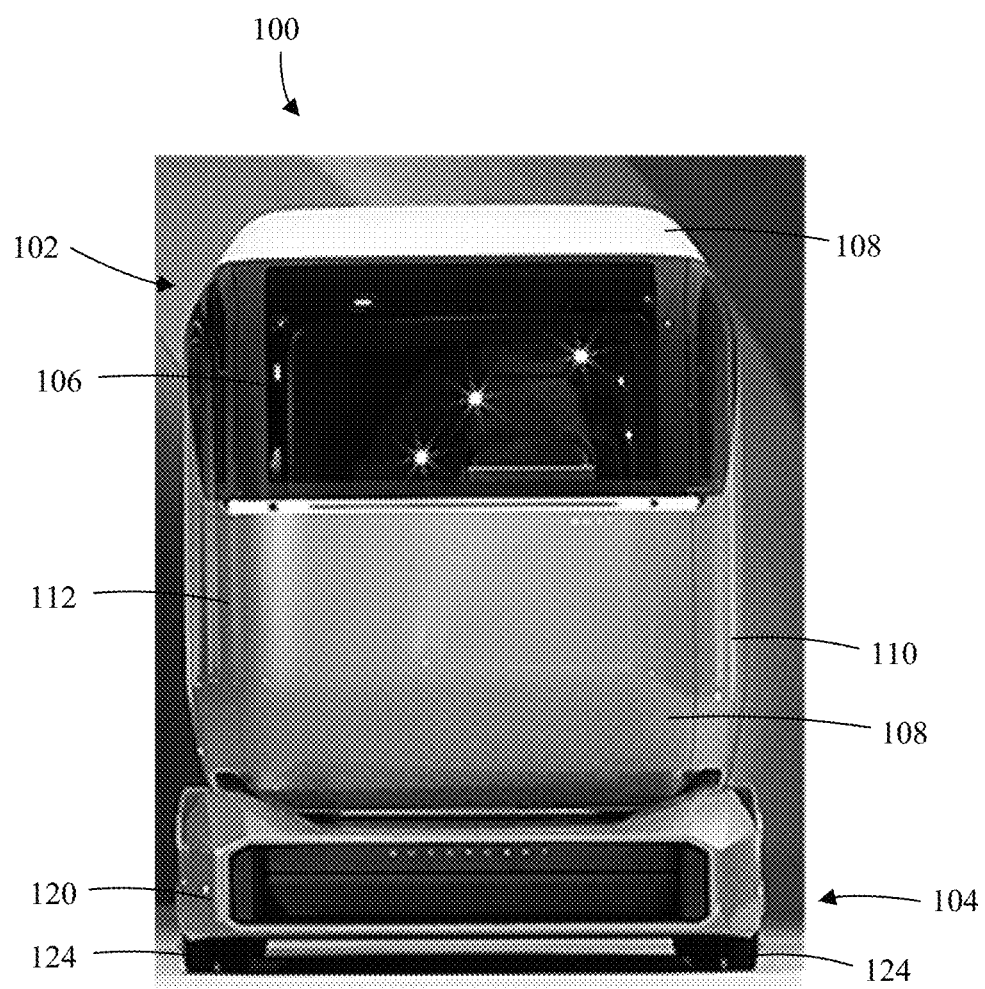
FIG. 4 is a front view of the vehicle.

FIG. 1 is a front, top, and left side perspective view of a vehicle 100. FIG. 2 is a rear, top, and right-side perspective view of the vehicle 100. FIG. 3 is a left side view of the vehicle. FIG. 4 is a front view of the vehicle. The vehicle 100 includes an upper body 102. The vehicle 100 includes a lower body 104. The upper body 102 can include a windshield 106. The upper body 102 can include upper body panels 108. The upper body 102 can include a first front door 110. The upper body 102 can include a second front door 112. The upper body 102 can include a first rear door 114. The upper body 102 can include a second rear door 116. The upper body 102 can include rear lights 118. The lower body 104 can include a front bumper 120. The lower body 104 can include a rear bumper 122. The lower body 104 can include wheels 124. The lower body 104 can include at least one lower body panel 126 extending between the wheels 124. In one embodiment, the vehicle has an overall width of 1 m-2 m, (e.g., 1.38 m), an overall height of 1 m-2 m (e.g., 1.82 m), and an overall length of 2 m-3 m (e.g., 2.85 m), but the vehicle 100 may be of any width, height, or length.

Figure 5:
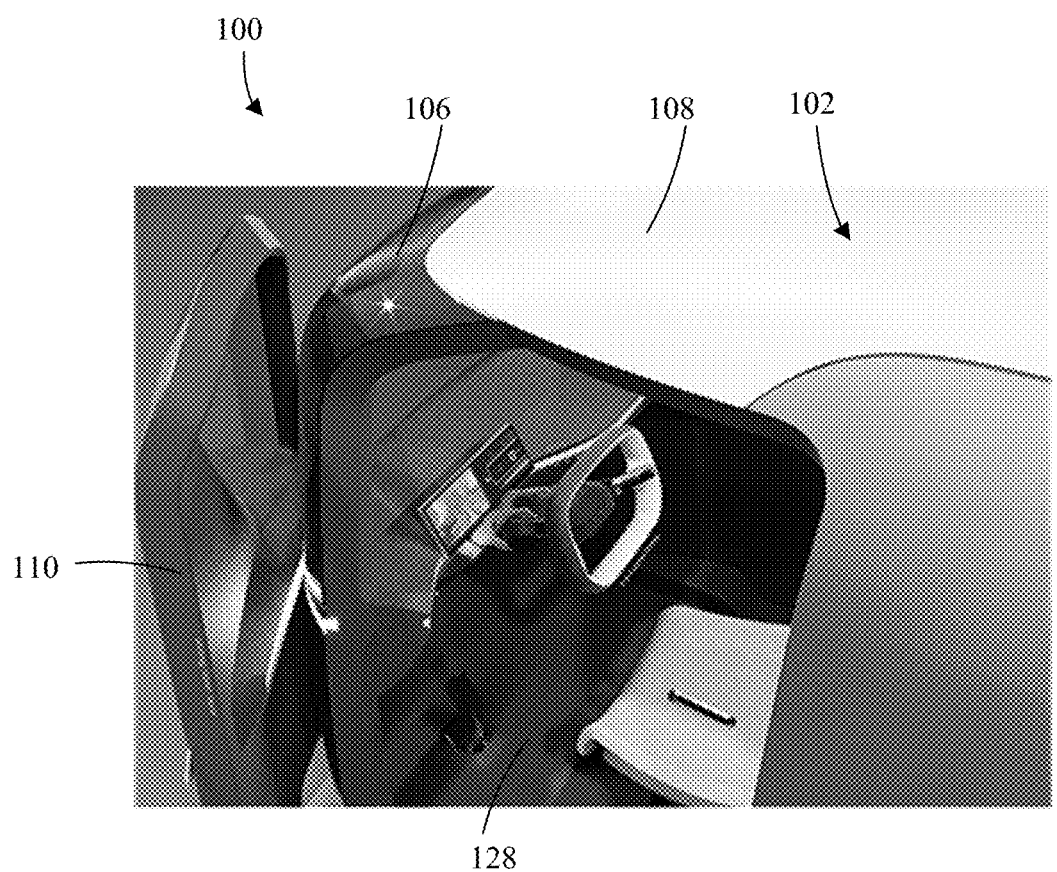
FIG. 5 is a perspective view of an upper body of the vehicle with a first door in an open position to allow access to a passenger compartment.
Figure 7:
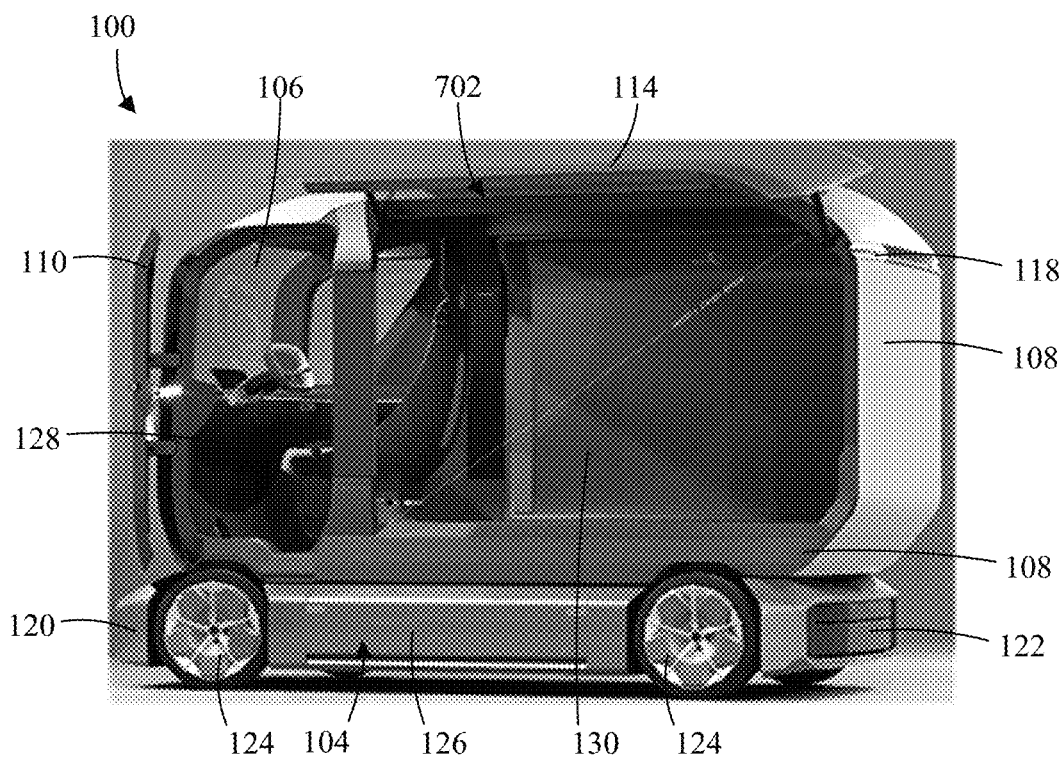
FIG. 7 is a perspective view of a first example of an upper body attached to the lower body.

FIG. 5 is a perspective view of the upper body 102 of the vehicle 100 showing the first front door 110 in an open position to allow access to a passenger compartment 128. The passenger compartment 128 is defined by the upper body 102. A steering wheel, brake pedal, acceleration pedal, driver seat, driver display, and one or more passenger seats may be disposed inside the passenger compartment 128. The passenger compartment 128 may include a floor height of 50 cm-1 m (e.g., 55 cm) or any other height. The upper body 102 may also define a storage compartment 130 (FIG. 7)

between the passenger compartment 128 and a rear of the vehicle 100. The height of a floor of the storage compartment 130 can be 50 cm-1 m (e.g., 70 cm) or any other height. The storage compartment 130 can include a storage space of 3,000 Liters or any other volume. The upper body 102 may or may not include a partition between the passenger compartment 128 and the storage compartment 130. The partition may be permanent or removeable. As shown in FIG. 5, the first front door 110 and/or the second front door 112 may be slidably connected to an exterior of the upper body 102 such that the first front door 110 slides along the exterior of the upper body 102 towards a front of the upper body 102 when opened. This allows the size of an exterior profile of the vehicle 100 to be minimized when the first front door 110 and/or the second front door 112 are open. In other embodiments, the first front door 110 and/or the second front door 112 may open in any direction relative to the upper body 102. For example, the first front door 110 and/or the second front door 112 may slide along an exterior of the upper body 102 towards a rear of the upper body 102 when opened. As shown later in FIGS. 7 and 8, the first rear door 114 and/or the second rear door 116 can be hingedly connected to a roof of the vehicle 100. When moved into an open position, the first and second rear doors 114, 116 can slide to overlap an exterior of the roof of the vehicle 100. In other embodiments, the first rear door 114 and/or the second rear door 116 may open in any direction relative to the upper body 102.

The vehicle 100 may include a network interface (not shown) allowing an ECU or one or more controllers of the vehicle 100 to communicate with one or more external devices. The external devices may include but are not limited to a mobile phone, a tablet computer, a laptop computer, a notebook computer, a desktop computer, or a server computer, a cloud-based server, other networked devices or systems, or a combination thereof. The communication may be wired or wireless (e.g., WiFi, Bluetooth, USB, HDMI, Wireless USB, Near Field Communication (NFC), Ethernet, a radio frequency, and/or other interfaces for communicating data between one or more external devices). The communication may also exist through a cellular network, for example, over 3G, 4G, 5G, CDMA, or GSM.

The ECU or one or more controllers of the vehicle 100 may collect data for transfer and/or storage. The ECU or one or more controllers of the vehicle 100 may also receive data from one or more of the external devices. The data may include but is not limited to location of the vehicle, navigation information, driving route information, destination information, drive time, traffic conditions, road conditions, weather, or delivery time. The data may be transmitted to a server used to implement a software as a service product at which records of the vehicle's data are stored. For example, one or more sensors may transmit the data to a controller of the vehicle 100. The controller transmits the data to a network. The data is transmitted from the network to a server optionally including a database and/or one or more of the external devices. The one or more external devices may include a server. The server may include a hardware component or a software component (e.g., a web server).

Figure 6:
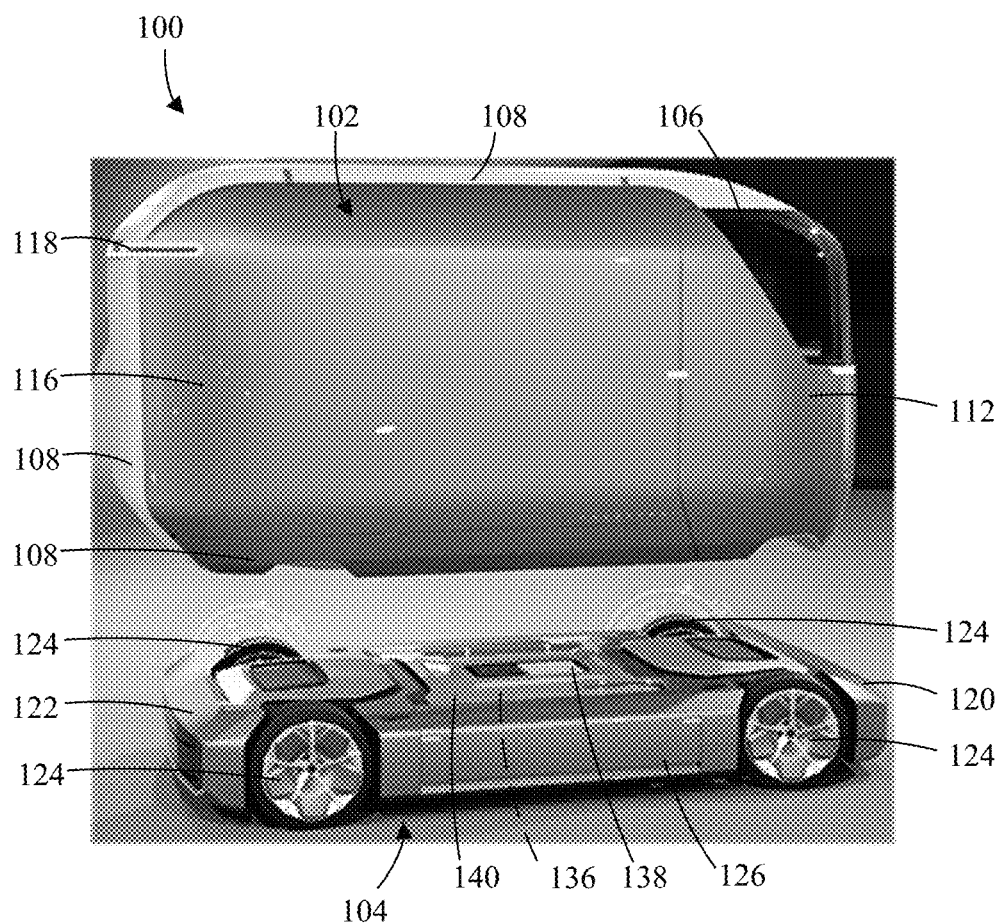
FIG. 6 is a perspective view of the upper body of the vehicle removed from a lower body of the vehicle.

FIG. 6 is a perspective view of the upper body 102 removed from the lower body 104. The upper body 102 may be removably coupled to the lower body 104. The upper body 102 can be repeatably disconnected, removed, and reconnected to the lower body 104. The upper body 102 can couple to the lower body 104 in one or more locations using any type of mechanical attachment. The upper body 102 can be disconnected and reconnected to the lower body 104 using a crane, hoist, lift, drone or other aerial vehicle, or any other suitable device. In some embodiments, the upper body 102 can remain stationary and the lower body 104 can be driven underneath the upper body 102 to couple and/or decouple the upper body 102 from the lower body 104. Removing the upper body 102 from the lower body 104 provides convenient access to the lower body 104 and its components for repairs and maintenance.

Figure 8:
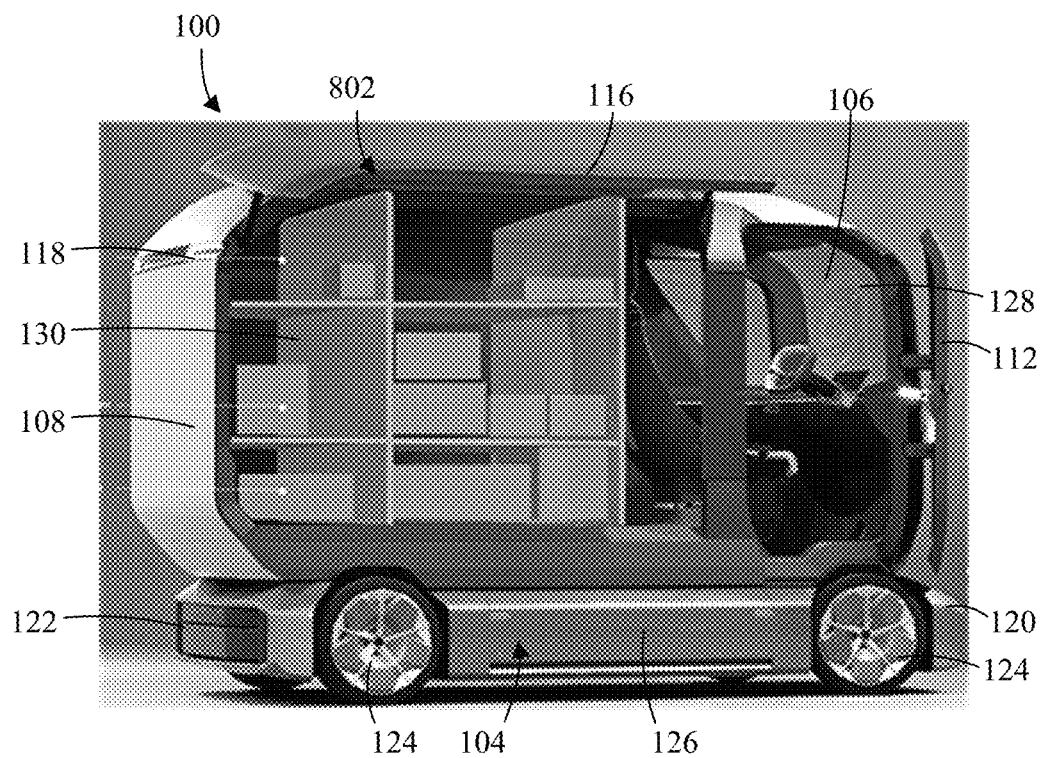
FIG. 8 is a perspective view of a second example of an upper body attached to the lower body.

In some embodiments, the upper body 102 can be removed from the lower body 104 and a different upper body having different characteristics can be connected to the lower body 104. For example, other upper bodies may include unique components or varying sizes, dimensions, and features. FIG. 7 is a perspective view of a first example of an upper body 702 attached to the lower body 104. In this first example, the storage compartment defined by the upper body 702 is empty and does not include any additional features. FIG. 8 is a perspective view of a second example of an upper body 802 attached to the lower body 104. In this second example, the storage compartment of the upper body 802 includes shelving designed to hold packages for delivery. Examples of features included in different upper bodies may include but are not limited to heated or cooled storage compartments to store and transport food or other perishable goods, vending machines, personal lockers, passenger seating, or emergency services equipment (e.g., fire suppression). Because the upper body can be removed from the lower body 104 and can be replaced by a different upper body, manufacturing of the vehicle 100 is simplified. For example, a standardized lower body can be produced to suit a wide range of upper bodies to construct different vehicles.

Figure 9:
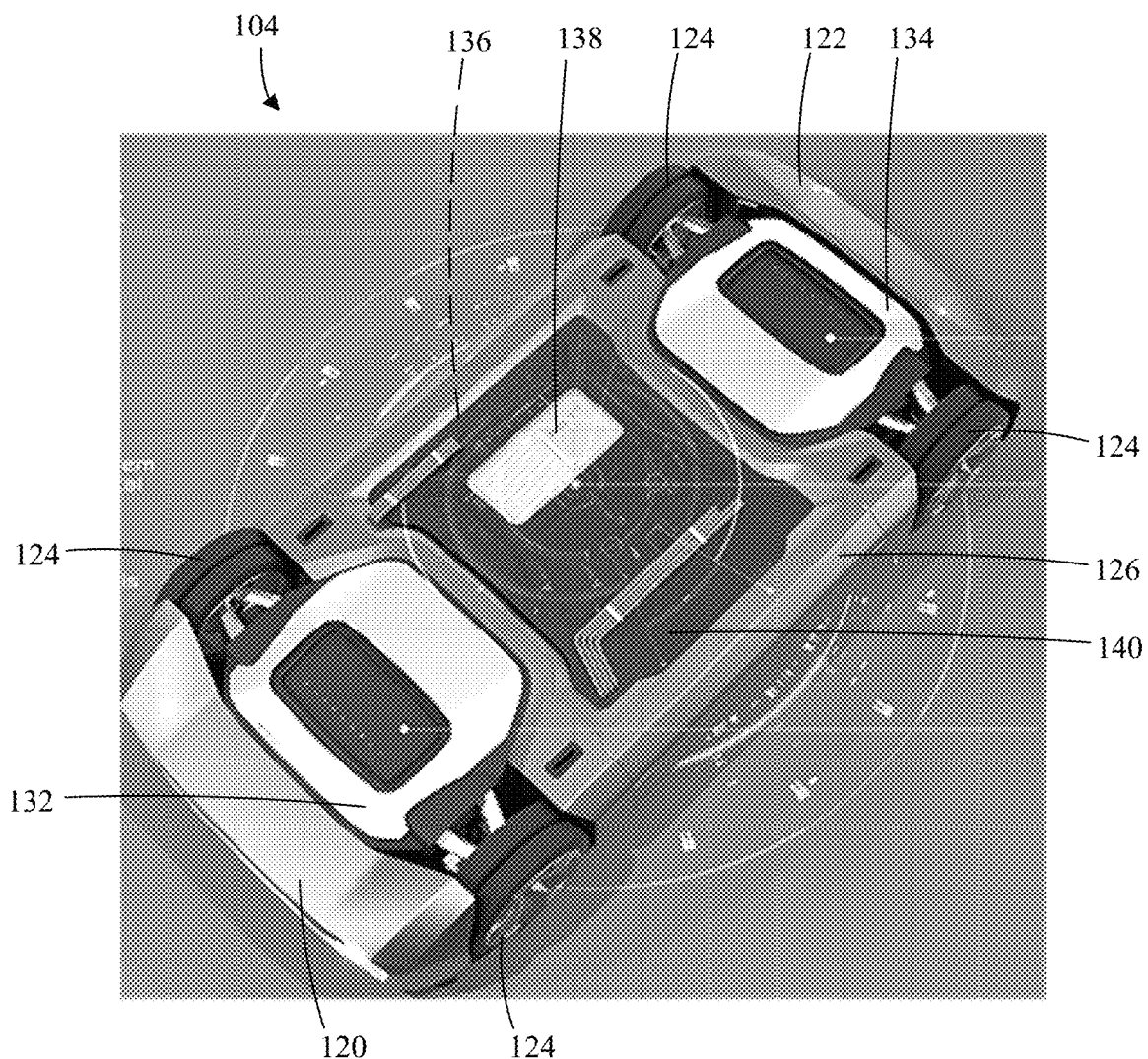
FIG. 9 is a perspective view of the lower body of the vehicle.

FIG. 9 is a perspective view of the lower body 104 of the vehicle 100. In the illustrated, non-limiting example, the lower body 104 includes a first housing 132 and a second housing 134 included in a lower body frame 154 shown in FIG. 11. The first housing 132 may or may not be identical to the second housing 134. The first housing 132 is coupled to the front bumper 120. The second housing 134 is coupled to the rear bumper 122. At least one lower body panel 126 can be disposed between the first housing 132 and the second housing 134. The lower body panel 126 and/or the lower body frame can define a recess 136 between the first housing 132 and the second housing 134. A battery 138 can be disposed in the recess 136. The battery 138 can include one or more battery cells and can include any type of lead acid battery, lithium ion battery, or a battery of any other type. A cover 140 may enclose the recess 136.

Figure 10:
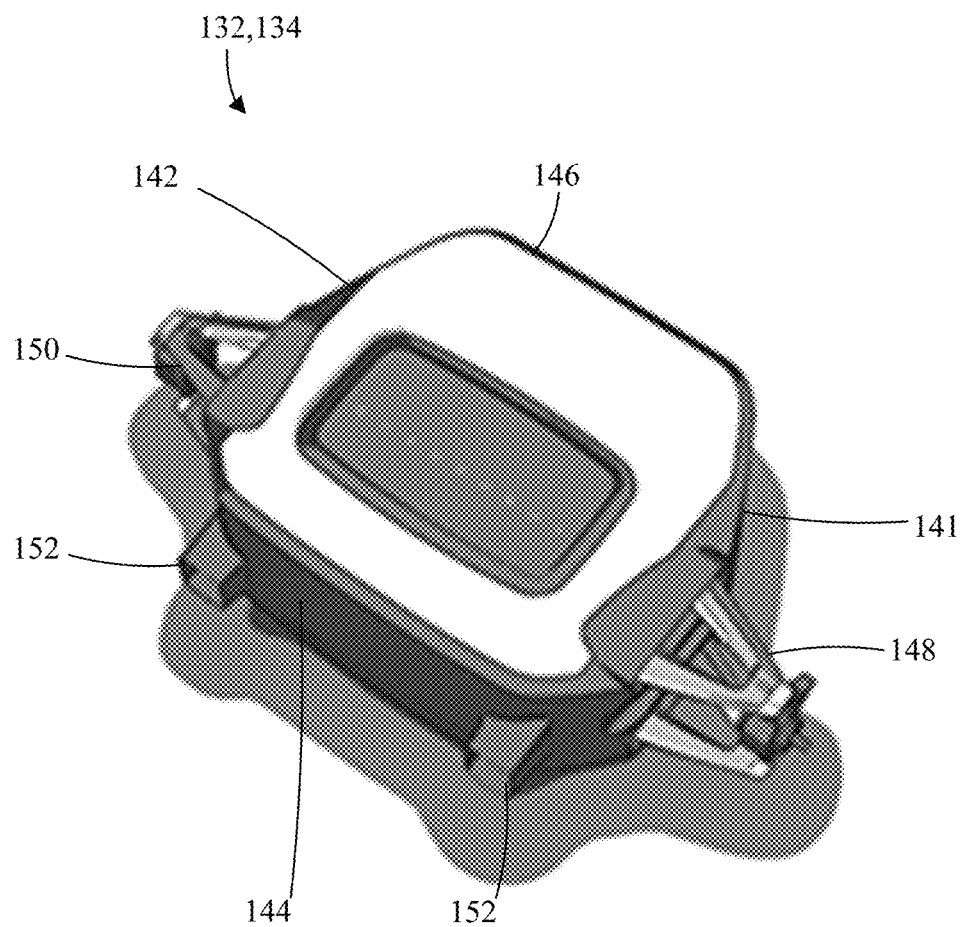
FIG. 10 is a perspective view of a housing.

FIG. 10 is a perspective view of a housing 132, 134. The illustrated housing 132, 134 may include features similar to the first housing 132 and the second housing 134. The housing 132, 134 can be made of any aluminum alloy, steel, carbon fiber, plastic, any other material, or any combination thereof. The housing 132, 134 defines an interior space. In other words, the interior space is enclosed by the housing 132, 134. The housing 132, 134 can enclose: a power train unit (the power train unit includes, but is not limited to, one or more electric motors, a transmission, and a drivetrain); a power train control unit operatively coupled to the power train unit that may include one or more controllers; a heat exchanger; brakes; one or more lead acid, lithium ion, or any other type of batteries; climate control components; a steering rack; and/or a steering linkage. The power train unit may include one electric motor for each wheel 124. Drive train transfers may be carried out by the power train units disposed in the first housing 132 and the second housing 134.

The first housing 132 and the second housing 134 may or may not include identical components. One or more components may be omitted from the first housing 132 and/or the second housing 134. For example, one of the first housing 132 or the second housing 134 may not include the power train unit and the power train control unit. In this way, a 2-wheel drive vehicle can be easily constructed. In embodiments where the power train unit and the power train control unit are not included in one of the first housing 132 or the second housing 134, the housing omitting the power train unit and the power train control unit may be considered an "auxiliary" housing. The auxiliary housing may include components to extend the driving range of the vehicle 100 and/or improve performance of the power train unit such as: one or more capacitors; ultracapacitors capable of regenerative braking; containers retaining liquid or compressed gasses for fuel or compressed gas propulsion; or additional lead acid, lithium ion, or any other type of batteries. The auxiliary housing may include components for temperature control (e.g., refrigeration) of the passenger compartment 128 and/or the storage compartment 130. The auxiliary housing may include an internal combustion engine or any hybrid propulsion system. The internal combustion engine or hybrid propulsion system may provide additional power to the wheels 124, extend the driving range of the vehicle 100, and/or allow the vehicle 100 to operate in the event that batteries of the vehicle 100 are depleted or components of the power train unit fail. The auxiliary housing may include features specific to upper bodies having various characteristics and applications. For example, the auxiliary housing may include a motor and controls for a winch, lift, grinder, saw, or any other device.

The housing 132, 134 can include a first side portion 141 and an opposing second side portion 142. The housing 132, 134 can include a first end portion 144 and an opposing second end portion 146. The first end portion 144 and the second end portion 146 extend between the first side portion 141 and the second side portion 142. A first pair of triangular members 148 may be coupled to the first side portion 141 and a second pair of triangular members 150 may be coupled to the second side portion 142. The first pair of triangular members 148 and the second pair of triangular members 150 each provides suspension to one of the wheels 124. One of the wheels 124 may be coupled to the housing 132, 134 between the triangular members of the first pair of triangular members 148. Another of the wheels 124 may be coupled to the housing 132, 134 between the triangular members of the second pair of triangular members 150. In other embodiments, the first and second pairs of triangular members 148, 150 may not be triangular and may have any other shape, configuration, or orientation. The first end portion 144 of the housing 132, 134 can include least one port 152 sized and shaped to receive a portion of the front bumper 120 or the rear bumper 122. In some embodiments, the housings 132, 134 may not include a port 152.

Figure 11:
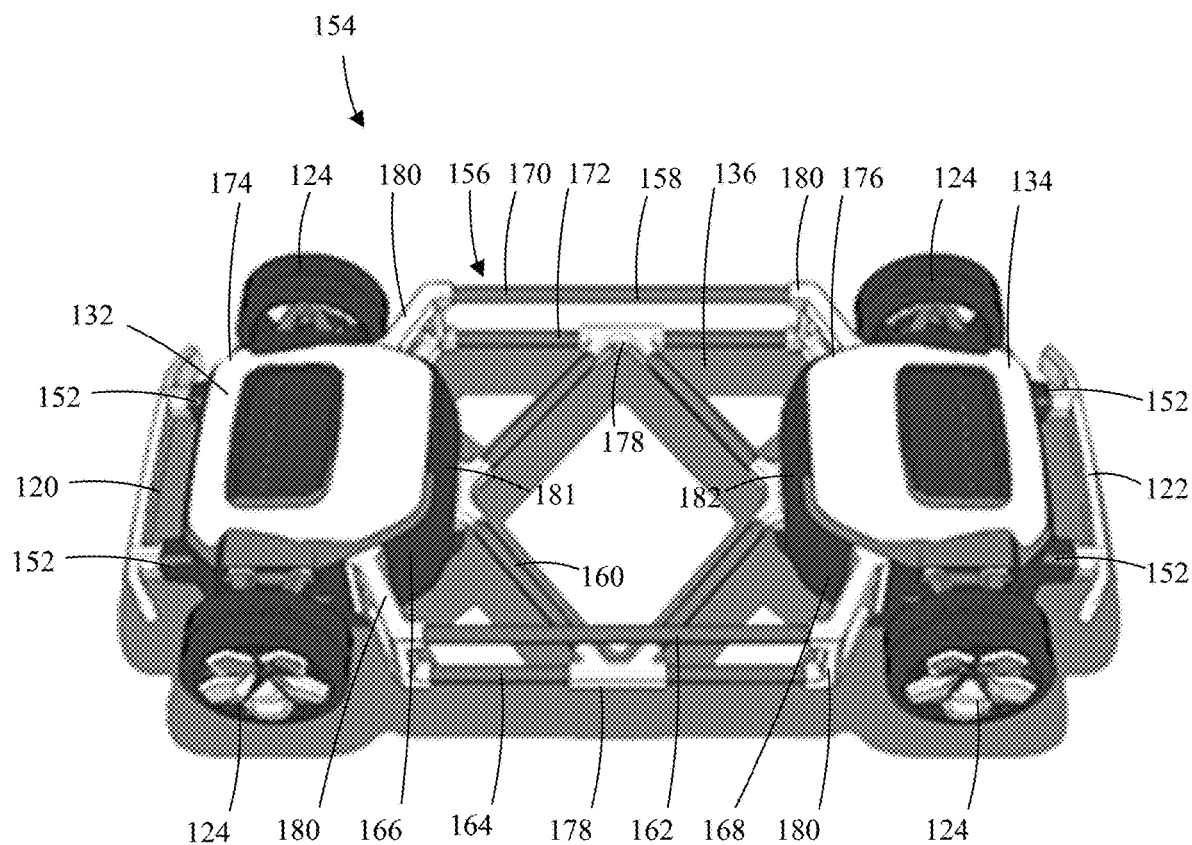
FIG. 11 is a perspective view of a lower body frame.

FIG. 11 is a perspective view of a lower body frame 154. The lower body frame 154 includes the first housing 132. The lower body frame 154 includes the second housing 134. The lower body frame 154 includes a support assembly 156. The support assembly 156 couples the first housing 132 to the second housing 134 and provides structural support to the lower body 104. The first housing 132, the second housing 134, and the support assembly 156 are each capable of sustaining one or more forces from the weight of upper body 102, cargo and passengers inside the upper body 102, forces applied to the vehicle 100 while driving, or any other forces.

The support assembly 156 can include an external lattice structure 158 coupled to the first housing 132 and the second housing 134. In the illustrated, non-limiting example, the external lattice structure 158 has a hexagonal shape. In other embodiments, the external lattice structure 158 can include any other shape. The lower body frame 154 can include an internal lattice structure 160 coupled to the first housing 132, the second housing 134, and to the external lattice structure 158. In the illustrated, non-limiting example, the internal lattice structure 160 has a diamond shape. In other embodiments, the internal lattice structure 160 can include any other shape. The external lattice structure 158 and the internal lattice structure 160 can include trusses, beams, rods, or any other type of structural member having any cross-sectional shape. The external lattice structure 158 and the internal lattice structure 160 can be made of any aluminum alloy, steel, carbon fiber, plastic, any other material, or any combination thereof. The external lattice structure 158 and the internal lattice structure 160 can be connected to each other using adhesive, welding, rivets, bolts, screws, or any other means of attachment. The external lattice structure 158 and the internal lattice structure 160 can be connected to the first housing 132 and the second housing 134 using adhesive, welding, rivets, bolts, screws, or any other means of attachment. In some embodiments, the external lattice structure 158 and the internal lattice structure 160 can be coupled to each other or to the first housing 132 and the second housing 134 using joints made of the same or different materials. The joints can receive portions of the external lattice structure 158 and/or the internal lattice structure 160 and can include trusses, beams, rods, or any other type of structural member having any cross-sectional shape. The joints may be connected to the first and second housings 132, 134 or may connect the external lattice structure 158 to the internal lattice structure 160 using adhesive, welding, rivets, bolts, screws, or any other means of attachment.

The external lattice structure 158 can include a first elongate member 162 and a second elongate member 164 each coupled at one end to a first side portion 166 of the first housing 132. The first elongate member 162 and the second elongate member 164 can each be coupled at an opposing end to a first side portion 168 of the second housing 134. The external lattice structure 158 can include a third elongate member 170 and a fourth elongate member 172 each coupled at one end to a second side portion 174 of the first housing 132. The third elongate member 170 and the fourth elongate member 172 can each be coupled at an opposing end to a second side portion 176 of the second housing 134.

The first elongate member 162 can be parallel to the second elongate member 164. In other embodiments, the first elongate member 162 and the second elongate member 164 can form any angle relative to each other. The third elongate member 170 can be parallel to the fourth elongate member 172. In other embodiments, the third elongate member 170 and the fourth elongate member 172 can form any angle relative to each other. The first elongate member 162 and the second elongate member 164 can also be parallel to the third elongate member 170 and the fourth elongate member 172. In other embodiments, the first elongate member 162 and the second elongate member 164 can form any angle relative to the third elongate member 170 and the fourth elongate member 172.

The external lattice structure 158 can be substantially coplanar with the first housing 132 and the second housing 134. For example, the first elongate member 162 and the third elongate member 170 can be substantially coplanar with a top surface of the first housing 132 and/or a top surface of the second housing 134. The second elongate member 164 and the fourth elongate member 172 can be substantially coplanar with a bottom surface of the first housing 132 and/or a bottom surface of the second housing 134. The internal lattice structure 160 can be substantially coplanar with the bottom surface of the first housing 132 and/or the bottom surface of the second housing 134.

In some embodiments, the second elongate member 164 and the fourth elongate member 172 can each include a first segment coupled to the first housing 132 and a second segment coupled to the second housing 134. The first segment and the second segment of each of the second elongate member 164 and the fourth elongate member 172 can be coupled using a joint 178.

The support assembly 156 can include the internal lattice structure 160 coupled to a second end portion 181 of the first housing 132. The internal lattice structure 160 can be coupled to a second end portion 182 of the second housing 134. The internal lattice structure 160 can be coupled to the second elongate member 164. The internal lattice structure 160 can be coupled to the fourth elongate member 172. As previously discussed, the internal lattice structure 160 can have a diamond shape or any other shape. The internal lattice structure 160 can be coupled to the second elongate member 164 and/or to the fourth elongate member 172 using the joints 178.

The first elongate member 162 and/or the second elongate member 164 can be coupled to the first side portion 166 of the first housing 132 using a first joint 180. The first elongate member 162 and/or the second elongate member 164 can be coupled to the first side portion 168 of the second housing 134 using a second joint 180. The third elongate member 170 and/or the fourth elongate member 172 can be coupled to the second side portion 174 of the first housing 132 using a third joint 180. The third elongate member 170 and/or the fourth elongate member 172 can be coupled to the second side portion 176 of the second housing 134 using a fourth joint 180.

The first elongate member 162, the second elongate member 164, the third elongate member 170, and/or the fourth elongate member 172 can include trusses, beams, rods, or any other type of structural member having any cross-sectional shape. The first elongate member 162, the second elongate member 164, the third elongate member 170, and/or the fourth elongate member 172 can be made of any aluminum alloy, steel, carbon fiber, plastic, any other material, or any combination thereof. The first elongate member 162, the second elongate member 164, the third elongate member 170, and/or the fourth elongate member 172 can be connected to the first and second housings 132, 134 or to the internal lattice structure 160 using adhesive, welding, rivets, bolts, screws, or any other means of attachment. The first elongate member 162, the second elongate member 164, the third elongate member 170, and/or the fourth elongate member 172 may or may not include identical dimensions.

The joints 178 and/or 180 can include trusses, beams, rods, or any other type of structural member having any cross-sectional shape. The joints 178 and/or 180 may be capable of receiving portions of other structural members and may couple to one or more of the first elongate member 162, the second elongate member 164, the third elongate member 170, and/or the fourth elongate member 172. The joints 178 and/or 180 may be made of the same or different materials as the first elongate member 162, the second elongate member 164, the third elongate member 170, and/or the fourth elongate member 172. The joints 178 and 180 can be coupled to the first housing 132, the second housing 134, the first elongate member 162, the second elongate member 164, the third elongate member 170, and/or the fourth elongate member 172 using adhesive, welding, rivets, bolts, screws, or any other means of attachment.

The support assembly 156 is not limited to the described examples and may include any size, shape, configuration, and orientation. By varying the length, width, shape, and size of the external lattice structure 158, the internal lattice structure 160, the first elongate member 162, the second elongate member 164, the third elongate member 170, and/or the fourth elongate member 172, lower bodies 104 of varying sizes, shapes, and dimensions can be easily built.

The first housing 132, the second housing 134, and/or the support assembly 156 allow for a reduced exterior profile of the lower body 104. This reduced exterior profile creates a low center of gravity for the vehicle 100. The low center of gravity improves handling of the vehicle 100 and improves safety of the vehicle 100 during operation.

The underside of the lower body 104, the lower body frame 154, and/or the bottom surfaces of the first housing 132 and the second housing 134 can be designed to maximize airflow under the vehicle 100 to provide heat dissipation. For example, the bottom surfaces of the first housing 132 and the second housing 134 can include fins, protrusions, corrugations, or any other features (not shown) to maximize the surface area of the first housing 132 and the second housing 134 exposed to airflow while the vehicle 100 is in operation. The airflow may dissipate heat generated by components disposed in the first housing 132 and the second housing 134 (e.g., the power train unit or batteries). These features also may create turbulent airflow under the vehicle 100 to further improve heat dissipation. The lower body 104 may also include a lower cover (not shown) enclosing a portion of the lower body frame 154. The lower cover may be made of aluminum alloy, carbon fiber, or any other suitable material. The lower cover can include fins, protrusions, corrugations, or any other features to maximize the surface area of the lower cover exposed to airflow while the vehicle 100 is in operation. These features also may create turbulent airflow under the vehicle 100 to further improve heat dissipation of heat dissipating components such as the power train unit or batteries.

Figure 12:
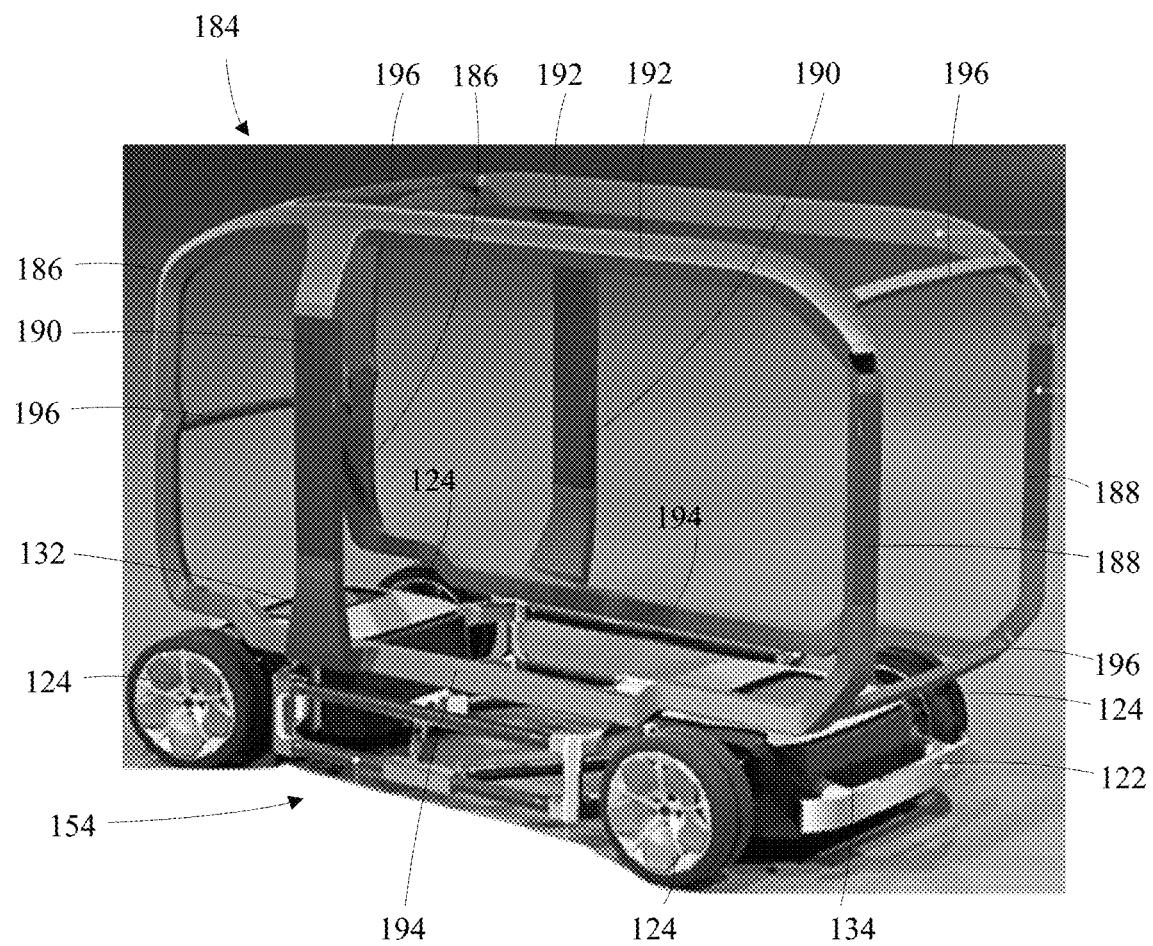
FIG. 12 is a perspective view of an upper body frame coupled to the lower body frame.

FIG. 12 is a perspective view of an upper body frame 184 coupled to the lower body frame 154. The upper body frame 184 can include two front columns 186. The upper body frame 184 can include two rear columns 188. The upper body frame 184 can include two side columns 190 disposed between the front columns 186 and the rear columns 188. The front columns 186, the rear columns 188, and/or the side columns 190 can be connected to top support members 192 and/or bottom support members 194. The front columns 186, the rear columns 188, the side columns 190, the top support members 192, and/or the bottom support members 194 can also be connected using additional support members 196. The bottom support members 194 can be removably coupled to the joints 180 of the lower body frame 154. In other embodiments, any portion of the upper body frame 184 can be removably coupled to the lower body frame 154 in any other location. The front columns 186, the rear columns 188, the side columns 190, the top support members 192, the bottom support members 194, and/or the additional support members 196 can include trusses, beams, rods, or any other type of structural member having any cross-sectional shape. The front columns 186, the rear columns 188, the side columns 190, the top support members 192, the bottom support members 194, and/or the additional support members 196 can be made of any aluminum alloy, steel, carbon fiber, plastic, any other material, or any combination thereof.

The upper body frame 184 is not limited to the described examples and may include any size, shape, configuration, and orientation. By varying the length, width, shape, and size of the front columns 186, the rear columns 188, the side columns 190, the top support members 192, the bottom support members 194, and/or the additional support members 196, upper bodies 102 of varying sizes, shapes, and dimensions can be easily built.

Implementations of any described controller and/or ECU (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "controller" should be understood as encompassing any of the foregoing hardware, either singly or in combination. The terms "signal" and "data" are used interchangeably. Further, portions of any described controller or ECU do not necessarily have to be implemented in the same manner.

Further, in one aspect, for example, the controller and/or the ECU can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. A vehicle frame comprising:
    a first housing and a second housing, wherein the first housing and the second housing each define an interior space, and wherein the first housing and the second housing each comprises:
        a first side portion and an opposing second side portion;
        a first end portion and an opposing second end portion, wherein the first end portion and the second end portion extend between the first side portion and the second side portion; and
        a first pair of triangular members coupled to the first side portion and a second pair of triangular members coupled to the second side portion, wherein the first pair of triangular members and the second pair of triangular members are each configured to support a wheel; and
    a support assembly coupled to the first housing and the second housing, wherein the support assembly comprises:
        a first elongate member and a second elongate member each coupled at one end to the first side portion of the first housing and coupled at an opposing end to the first side portion of the second housing; and
        a third elongate member and a fourth elongate member each coupled at one end to the second side portion of the first housing and coupled at an opposing end to the second side portion of the second housing.

2. The vehicle frame of claim 1, wherein the first end portion of the first housing and the first end portion of the second housing each include at least one port sized and shaped to receive a bumper, and wherein the first end portion of the first housing and the first end portion of the second housing face away from each other.

3. The vehicle frame of claim 1, wherein the first elongate member is parallel to the second elongate member and the third elongate member is parallel to the fourth elongate member.

4. The vehicle frame of claim 3, wherein the first elongate member and the second elongate member are parallel to the third elongate member and the fourth elongate member.

5. The vehicle frame of claim 1, wherein:
    the first elongate member and the third elongate member are substantially coplanar with a top surface of the first housing and a top surface of the second housing; and
    the second elongate member and the fourth elongate member are substantially coplanar with a bottom surface of the first housing and a bottom surface of the second housing.

6. The vehicle frame of claim 5, wherein the second elongate member and the fourth elongate member each comprises a first segment coupled to the first housing and a second segment coupled to the second housing, and wherein the first segment is coupled to the second segment using a joint.

7. The vehicle frame of claim 1, further comprising a lattice structure coupled to the second end portion of the first housing, the second end portion of the second housing, the second elongate member, and the fourth elongate member.

8. The vehicle frame of claim 7, wherein the lattice structure is diamond shaped.

9. The vehicle frame of claim 1, wherein:
    the first elongate member and the second elongate member are coupled to the first side portion of the first housing using a first joint and are coupled to the first side portion of the second housing using a second joint; and
    the third elongate member and the fourth elongate member are coupled to the second side portion of the first housing using a third joint and are coupled to the second side portion of the second housing using a fourth joint.

10. The vehicle frame of claim 1, wherein at least one of the first housing or the second housing encloses an electric motor, a power train unit, a power train control unit operatively coupled to the power train unit, a heat exchanger, a steering rack, and a steering linkage.

* * * * *